(12) United States Patent
Simmons

(10) Patent No.: US 6,761,235 B2
(45) Date of Patent: Jul. 13, 2004

(54) MACHINE FRAME ASSEMBLY FOR A TRACK-TYPE MACHINE

(75) Inventor: Gerald Paul Simmons, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 42 days.

(21) Appl. No.: 10/024,552

(22) Filed: Dec. 21, 2001

(65) Prior Publication Data

US 2003/0116364 A1 Jun. 26, 2003

(51) Int. Cl.⁷ .............................................. B62D 55/12
(52) U.S. Cl. .................... 180/9.46; 180/9.42; 180/9.54; 180/9.62
(58) Field of Search ............................ 180/9, 9.1, 9.23, 180/9.42, 9.62, 9.54, 9.46, 24.05

(56) References Cited

U.S. PATENT DOCUMENTS

| | | | |
|---|---|---|---|
| 3,299,978 A | * | 1/1967 | Sponsler et al. ......... 180/24.05 |
| 3,450,221 A | * | 6/1969 | Nelson ..................... 180/24.05 |
| 3,454,109 A | * | 7/1969 | Roberts ................... 180/24.05 |
| 3,656,642 A | | 4/1972 | Kostas et al. |
| 3,724,587 A | * | 4/1973 | Kasin et al. ................ 180/9.54 |
| 3,828,873 A | | 8/1974 | Oestmann |
| 4,064,956 A | * | 12/1977 | Wildey .................... 180/24.05 |
| 4,739,852 A | | 4/1988 | Stevens et al. |
| 5,058,382 A | | 10/1991 | Inoue et al. |
| 5,378,204 A | * | 1/1995 | Urvoy ........................ 474/110 |
| 5,679,090 A | | 10/1997 | Imanishi |
| 6,066,061 A | | 5/2000 | Yun |
| 6,152,253 A | | 11/2000 | Monaghan |
| 6,247,547 B1 | | 6/2001 | Lemke et al. |

\* cited by examiner

Primary Examiner—Lesley D. Morris
Assistant Examiner—Matthew Luby
(74) Attorney, Agent, or Firm—Finnegan, Henderson, Farabow, Garrett & Dunner

(57) ABSTRACT

A machine frame assembly is provided that includes a machine frame, a hollow pivot shaft attached to the machine frame and configured to support a drive assembly for a track-type machine to allow pivotal movement of the drive assembly relative to the machine frame, and a power source, a portion thereof extending into the hollow pivot shaft and a portion thereof mounted adjacent to an end of the hollow pivot shaft. The power source is configured to transmit power through the hollow pivot shaft.

21 Claims, 8 Drawing Sheets

US 6,761,235 B2

MACHINE FRAME ASSEMBLY FOR A TRACK-TYPE MACHINE

TECHNICAL FIELD

The present invention is generally directed to track-type machines. More particularly, the present invention is directed to a machine frame assembly for a track-type machine.

BACKGROUND

Traditionally, track-type machines have been driven by a power source contained within the body of the track-type machine, as seen, for example, in U.S. Pat. No. 3,828,873. Usually, these power sources have been mechanically coupled to input shafts that extend through the machine frame and engage a pair of sprockets. These sprockets generally are supported on opposite sides of the machine frame and are rotatably mounted to the machine frame. The sprockets may directly or indirectly drive an endless track about a roller frame to provide movement of the machine. Each roller frame is generally supported behind its midpoint by a pivot shaft, which extends from the machine frame. Each roller frame is also generally supported in front of its midpoint by an equalizer bar attaching both roller frames together. The midpoint of the equalizer bar is attached at the lateral midpoint of the machine frame. The equalizer bar controls the rotation of each roller frame about its pivot shaft. As the front of one roller frame is forced to rise by externally applied forces or uneven ground, the opposite roller frame is forced to fall by the equalizer bar. Each roller frame has idler wheels affixed to each end to support the endless track as it rotates.

One limitation of having a sprocket that is mounted to the machine frame of the track-type machine is that the roller frame is constrained in its movement. Another limitation of having a sprocket that is statically mounted to the machine frame is that the sprocket is cantilever supported off the machine frame. This may allow the sprocket to deflect and cause the endless track to twist when contacting the sprocket.

One approach for providing power to drive a track-type machine is disclosed in U.S. Pat. No. 3,656,642. In this arrangement, a roller frame is rigidly fixed to a pair of hardbar members to form a solid frame. A rear drive sprocket is supported on the roller frame and driven by an engine connected to a multi-speed transmission. The transmission in turn is connected to the rear drive sprocket by a conventional clutch mechanism. This track-type machine has a similar limitation to that of U.S. Pat. No. 3,828,873 in that the roller frame cannot pivot independent of the machine frame.

The present invention solves one or more of the problems associated with existing track-type machine designs.

SUMMARY OF THE INVENTION

One aspect of the present invention is directed to a machine frame assembly for a track-type machine including a machine frame, a hollow pivot shaft attached to the machine frame and configured to support a drive assembly for a track-type machine to allow pivotal movement of the drive assembly relative to the machine frame, and a power source, a portion thereof extending into the hollow pivot shaft and a portion thereof mounted adjacent to an end of the hollow pivot shaft. The power source is configured to transmit power through the hollow pivot shaft.

In yet another aspect, the invention is directed to a track-type machine including a machine frame, a hollow pivot shaft attached to the machine frame, a power source, and a drive assembly supported on the hollow pivot shaft. The power source is configured to transmit power through the hollow pivot shaft. The drive assembly includes a drive system and an endless track that engages the drive system.

The present invention is also directed to a method of driving a track-type machine. The track-type machine includes a machine frame, a hollow pivot shaft attached to the machine frame, a power source configured to transmit power through the hollow pivot shaft, and at least one drive assembly supported on the hollow pivot shaft. The drive assembly includes a drive system and an endless track that engages the drive system. The method includes transmitting power from the power source through the hollow pivot shaft to the drive system. The drive system drives the endless track.

BRIEF DESCRIPTION OF THE DRAWINGS

The accompanying drawings, which are incorporated in and constitute a part of this specification, illustrate one exemplary embodiment of the invention and together with the description, serve to explain the principles of the invention. In the drawings.

DETAILED DESCRIPTION

Reference will now be made in detail to the present exemplary embodiment of the invention, an example of which is illustrated in the accompanying drawings. Wherever possible, the same reference numbers will be used throughout the drawings to refer to the same or like parts.

Figure 1:
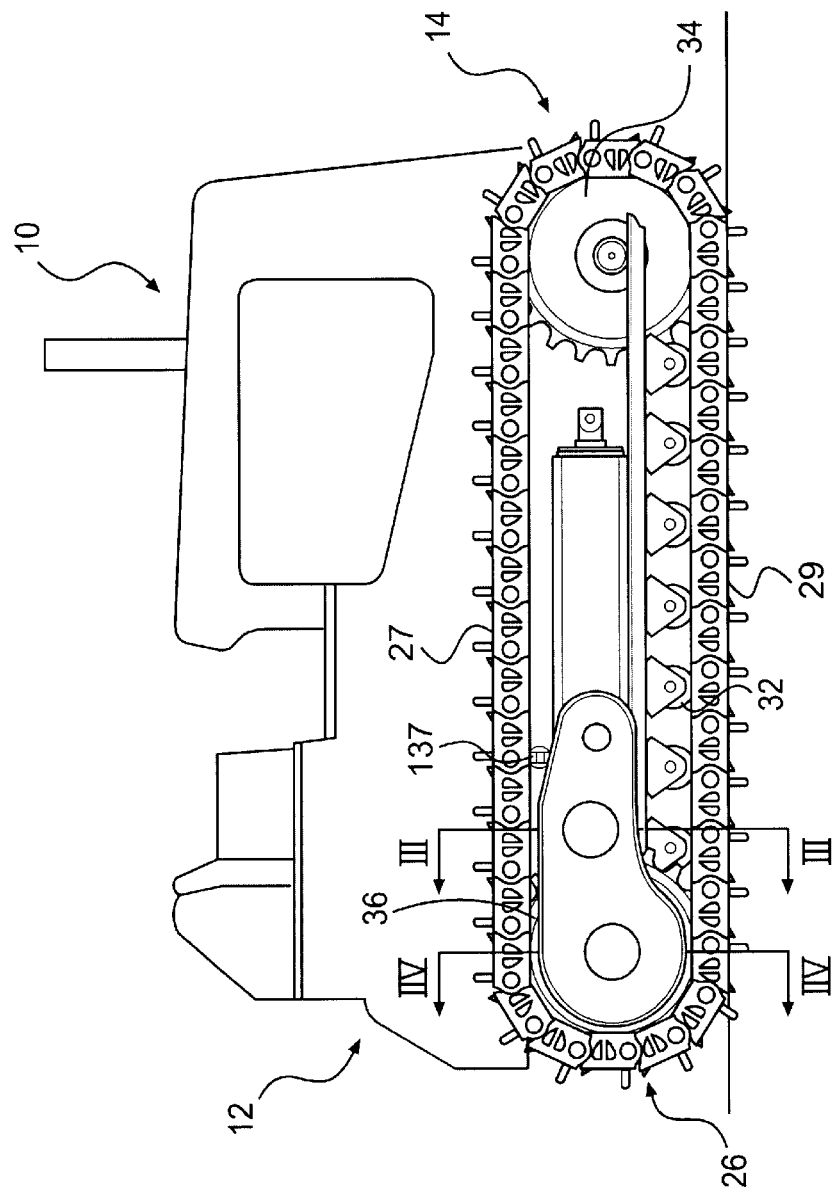
FIG. 1 is a diagrammatic elevation view of an exemplary embodiment of a track-type machine of the present invention.
Figure 3:
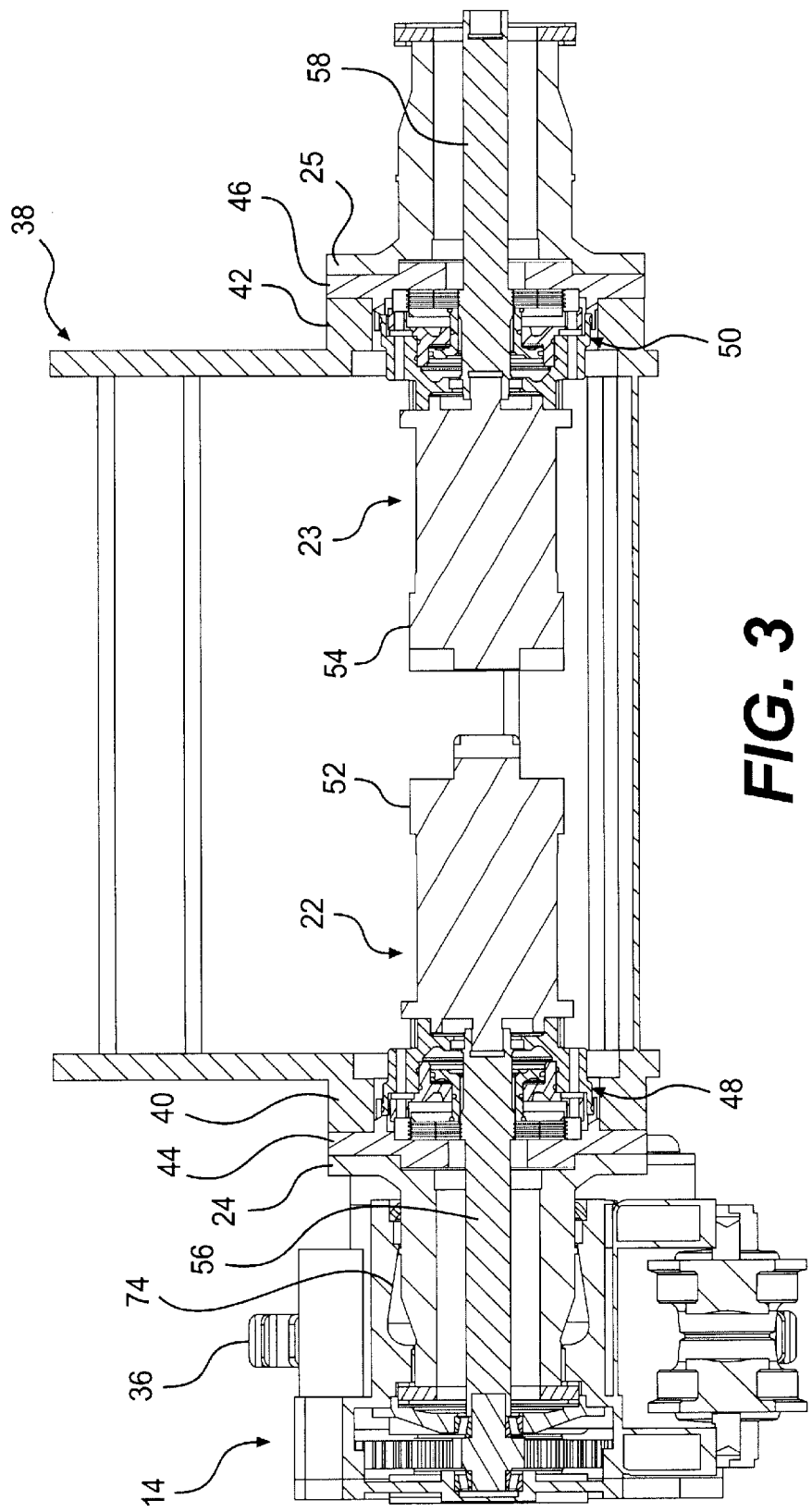
FIG. 3 is a diagrammatic section view of the machine assembly taken along line III—III of FIG. 1, with the endless track removed for clarity.

A track-type machine 10, as seen in FIG. 1, may include a body 12 and a pair of drive assemblies supported on a machine frame 38 (shown in FIG. 3). While only a single drive assembly 14 is shown in the accompanying drawings, it is understood that complimentary drive assemblies are typically provided on opposing sides of a track-type machine. Moreover, while FIG. 1 shows a tractor, embodiments of the present invention are equally applicable to other variations of track-type machines.

Figure 2:
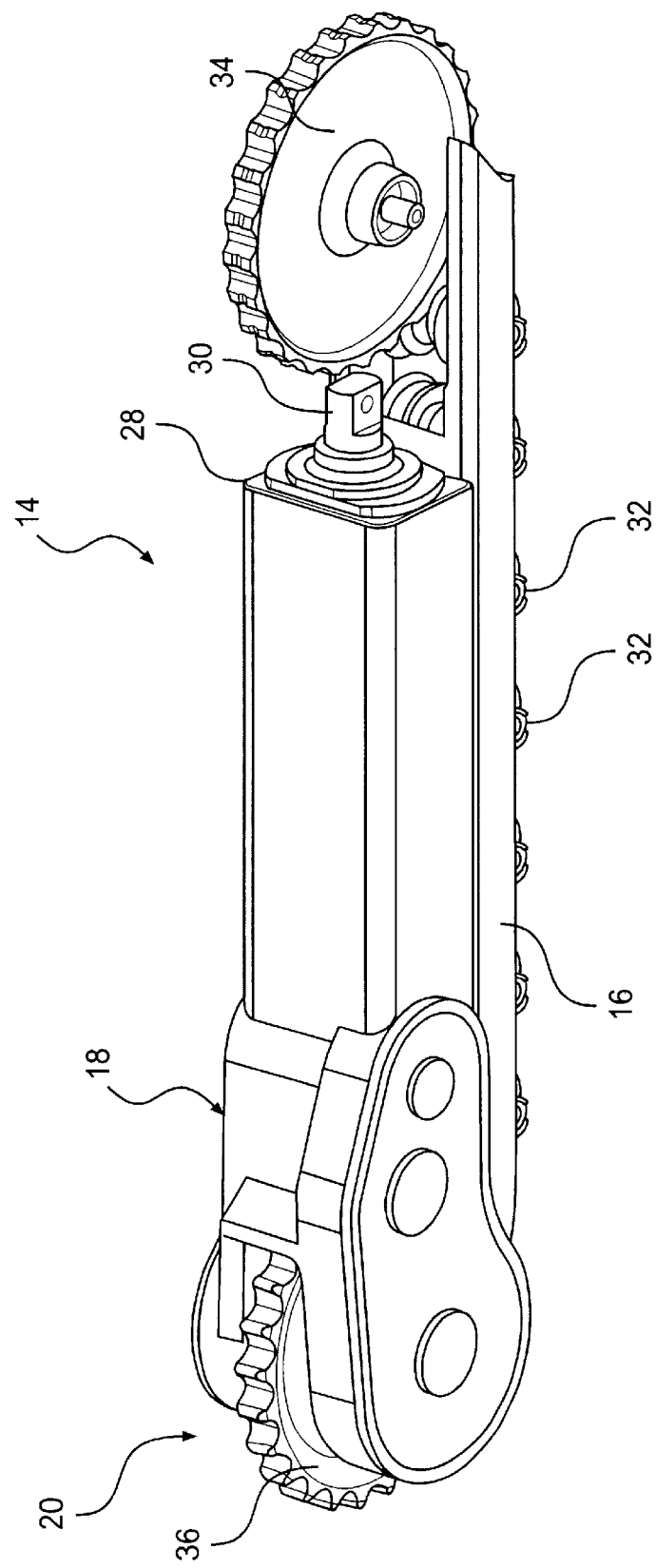
FIG. 2 is a diagrammatic perspective view of a single drive assembly of the track-type machine of FIG. 1, with the endless track removed for clarity.
Figure 4:
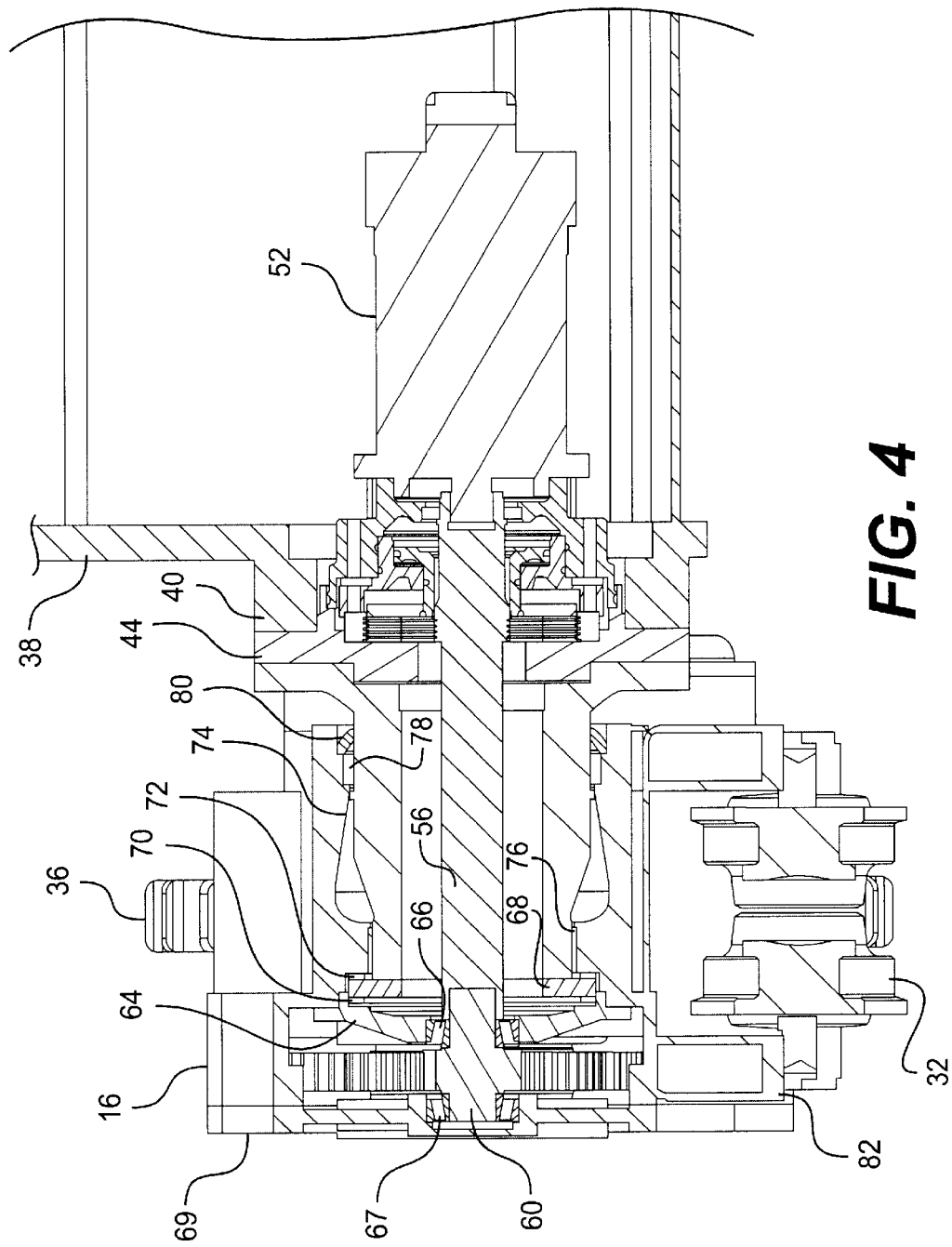
FIG. 4 is an enlarged diagrammatic partial section view of the machine assembly at an enlarged scale from that shown in FIG. 2.

With reference to FIG. 2, each drive assembly 14 includes a roller frame 16, which may be formed out of steel or any other suitable material. The roller frame 16 includes a yoke section 18 configured to support a drive system 20. The drive system 20 is driveably engaged with a power source 22 through a hollow pivot shaft 24, as shown in FIGS. 3 and 4. An endless track 26 (shown in FIG. 1) is driven about the roller frame 16 by the drive system 20 to provide locomotion for the track-type machine 10. By transmitting power through the pivot shaft 24, the drive assembly 14 is free to pivot relative to the machine frame 38, as will be described later in reference to FIG. 8.

A recoil mechanism housing 28 may be formed in the roller frame 16 and is configured to protect a recoil mechanism 30. A plurality of rollers 32 mounted to the roller frame 16 are configured to allow rotation of the endless track 26 about the roller frame 16. These rollers 32 may be fastened directly to the roller frame 16 or otherwise connected thereto.

The recoil mechanism 30 may be connected to a forward idler 34 via a spring (not shown) to allow the forward idler 34 to move fore and aft with respect to the roller frame 16. This allows the endless track 26 to absorb an impact with an object by allowing an initial displacement of the forward idler 34 upon contact with the object. The recoil system also is able to absorb injection of foreign material into the endless track system without over-tensioning the track.

A sprocket 36, which is part of the drive system 20, is arranged at the rear of the roller frame 16 in the yoke section 18. The endless track 26 is entrained around the sprocket 36 and the forward idler 34, whereby rotation of the sprocket 36 drives the endless track 26 around the roller frame 16. The endless track consists of two flights 27, 29, as shown in FIG. 1, extending between the idler 34 and the sprocket 36. In the exemplary embodiment shown, the yoke section 18 may be arranged between the flights 27, 29. Both the sprocket 36 and the forward idler 34 are depicted as having teeth to engage the endless track 26. It is contemplated, however, that the forward idler 34 need not include teeth. A smooth idler could also work in entraining the endless track 26 about the roller frame 16.

An exemplary embodiment of a drive assembly 14 supported on the hollow pivot shaft 24 is shown in FIGS. 3 and 4. A second hollow pivot shaft 25 is shown in FIG. 3 on an opposing side of the machine frame 38. While a second drive assembly would be supported on the second hollow pivot shaft 25, this feature is omitted from the drawing for clarity. The machine frame 38 includes first and second mounting rings 40, 42 formed therein. Each mounting ring 40, 42 is configured to allow insertion of a power source. In the disclosed embodiment, power source 22 is associated with hollow pivot shaft 24, and power source 23 is associated with hollow pivot shaft 25. Each power source may be sized to fit through the mounting rings 40, 42, for ease of assembly. Motor supports 44, 46 may be provided to support the power sources 22, 23 in the mounting rings 40, 42. The motor supports 44, 46 may also support disc brake assemblies 48, 50 that may be used to slow or stop the track-type machine. In this exemplary embodiment, each motor support 44, 46 is arranged between one of the hollow pivot shafts 24, 25, respectively, and the corresponding mounting ring 40, 42. An end of each hollow pivot shaft 24, 25 may be mounted to the machine frame 38 through the motor supports 44, 46 by fasteners, such as, for example, bolts. It is contemplated that other conventional means may be supplied to mount the hollow pivot shaft to the machine frame and all such conventional means are within the scope of the invention.

The power sources 22, 23 may be motors 52, 54, each having an output shaft 56, 58, respectively. Each output shaft 56, 58 is free to rotate within its respective hollow pivot shaft 24, 25 and extends substantially through that hollow pivot shaft. The motors 52, 54 may be mounted adjacent to an end of the hollow pivot shafts 24, 25 nearest the machine frame 38. In the exemplary embodiment, a longitudinal axis of each hollow pivot shaft 24, 25 is substantially parallel to a longitudinal axis of the motor output shaft. In the disclosed exemplary embodiment, the longitudinal axis for each hollow pivot shaft 24, 25 may be substantially co-axial with the longitudinal axis of each motor output shaft 56, 58, respectively.

In this exemplary embodiment, each motor 52, 54 may be an electrical motor, although one of ordinary skill in the art will appreciate that a hydrostatic motor or other motor could form part of the present invention. The electrical or hydrostatic motor can provide continuous variable rotation speeds, which may be useful when it is necessary to drive one side of a track-type machine 10 more slowly than the other side, for example, to turn the track-type machine 10. One of ordinary skill in the art will also appreciate that the power source may be an engine coupled to a mechanical transmission or differential system to transfer power from the engine through the hollow pivot shaft.

Figure 6:
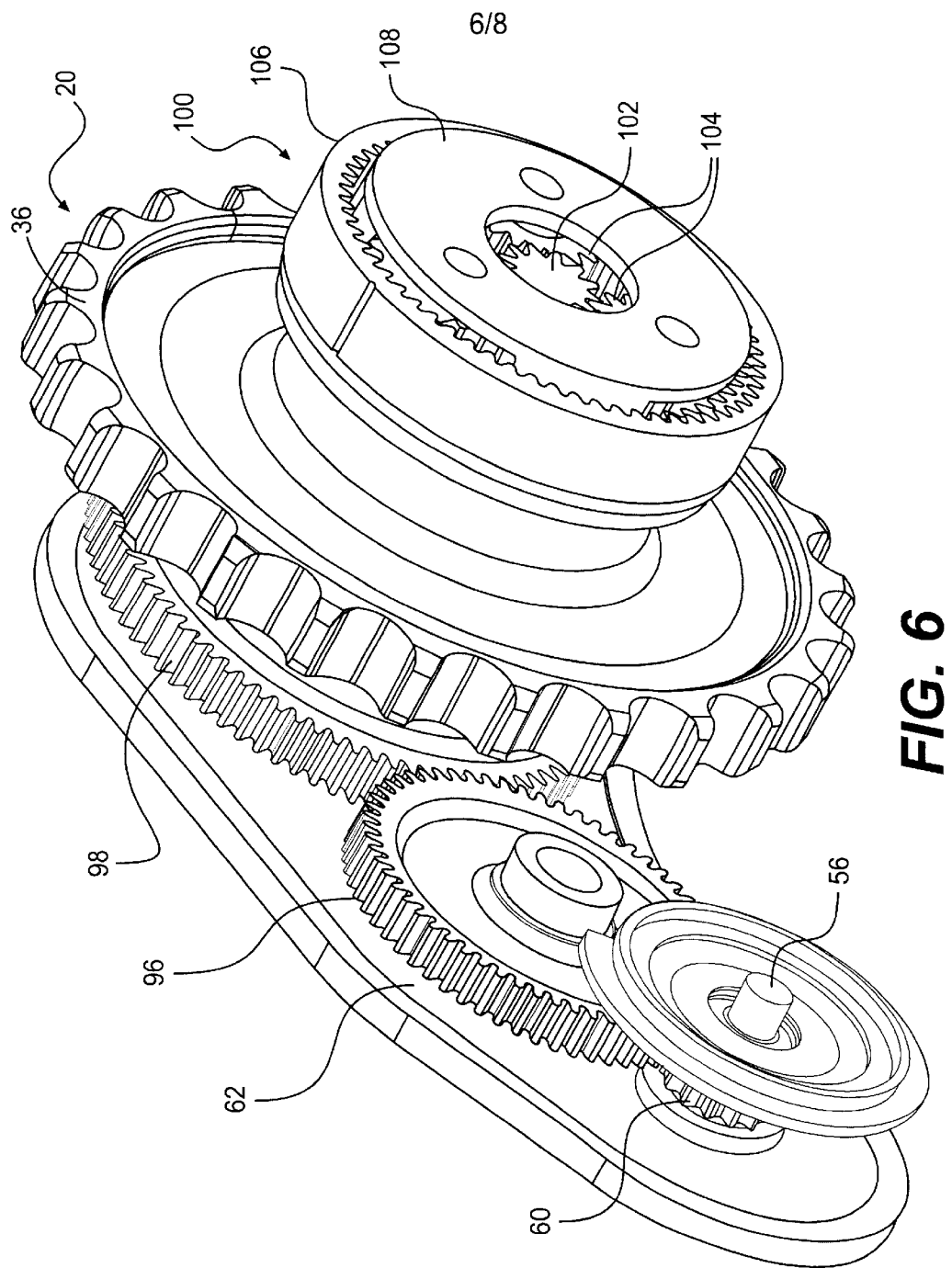
FIG. 6 is a diagrammatic perspective view of a drive system and gear train of the exemplary drive assembly of FIG. 2.

FIG. 4 shows an enlarged view of the roller frame 16 supported on the pivot shaft 24, and it is to be understood that a second drive assembly may be mounted on the second hollow pivot shaft 25 in a similar manner. As seen in FIG. 4, the output shaft 56 is a separate shaft attached to the motor 52. It is contemplated, however, that the output shaft may be integral with the motor 52. At one end of the output shaft 56 opposite the motor 52, a pinion 60 may be attached. The pinion 60 forms part of a gear train 62, as best seen in FIG. 6. One side of the pinion 60 is supported by a bearing carrier 64 that is connected to the roller frame 16. A tapered roller bearing assembly 66 is mounted in the bearing carrier 64 and assists in supporting the pinion 60. A tapered roller bearing assembly 67 is provided on the other side of the pinion 60 and is supported by a cover 69. As a result of this arrangement, the pinion 60 may constrain the output shaft 56 within the hollow pivot shaft 24.

A thrust plate 68 may be connected to the end of the hollow pivot shaft 24 using any suitable means. Thrust bearing 70, 72 are also provided. Thrust bearing 70 is arranged between the thrust plate 68 and the bearing carrier 64, while thrust bearing 72 is arranged between the thrust plate 68 and the roller frame 16. This arrangement assists in retaining the roller frame 16 on the hollow pivot shaft 24, which extends through a through hole 74 of the roller frame 16.

Sleeve bearings 76, 78 are located between the hollow pivot shaft 24 and the through hole 74 of the roller frame 16 to allow for pivotal movement of the roller frame 16 about the hollow pivot shaft 24. A seal 80 may also be provided to seal the space between the hollow pivot shaft 24 and the through hole 74.

A roller support member 82 is formed as part of the roller frame 16 and is configured to support one of the rollers 32. While the roller support member 82 is shown as being formed integral with the roller frame 16, it is contemplated that the roller support member may be formed as a separate piece and mounted to the roller frame 16.

Figure 5:
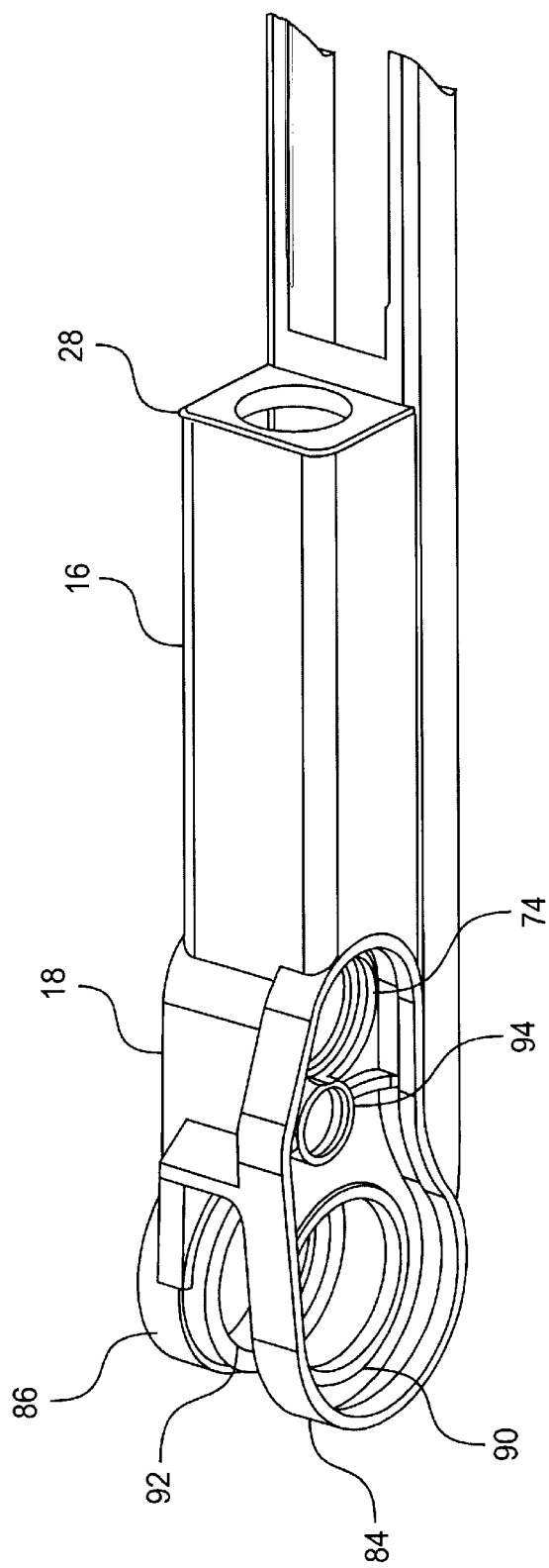
FIG. 5. is a diagrammatic perspective view of the exemplary roller frame of FIG. 2.

FIG. 5 shows the roller frame assembly 16 (without the rollers 32 for clarity) including the yoke section 18. The yoke section 18 includes two extending support members 84, 86, which are configured to support the drive system. Each extending support member 84, 86 has a through hole 90, 92, respectively. A through hole 94 is also provided in yoke section 18 to support an idler 96 of the gear train 62 (shown in FIG. 6).

FIG. 6 shows an exemplary embodiment of the gear train 62 intermeshing the motor output shaft 56 to the drive system 20 of the drive assembly 14. The gear train 62 includes the pinion 60 which is attached to the output shaft 56 (only a portion of which is shown) and may intermesh with the idler gear 96, which may be supported in the through hole 94 of the yoke section 18 shown in FIG. 5. The idler 96, in turn, may intermesh with a drive gear 98 that is connected to a planetary system 100. The sprocket 36 is connected to the planetary system 100 and is driven by rotation thereof. It is understood that any suitable bearings may be used to support the gears in the drive system 20.

The gear train 62 and planetary system 100 may provide desired speed reductions. In this exemplary embodiment, for example, the following reductions of speed are provided: approximately 3:1 between pinion 60 and drive gear 98; and approximately 5:1 between the drive gear 98 and the sprocket 36. Although exemplary reductions have been described for the gear train 62, it is understood that different reductions could be provided based on the power source 22 and the desired rotation of the sprocket 36. In addition, it is understood that a different gear train may be provided to transmit power from the power source 22 to the sprocket 36. Such modifications are known to those of ordinary skill in the art and are considered to be within the scope of the described invention.

Figure 7:
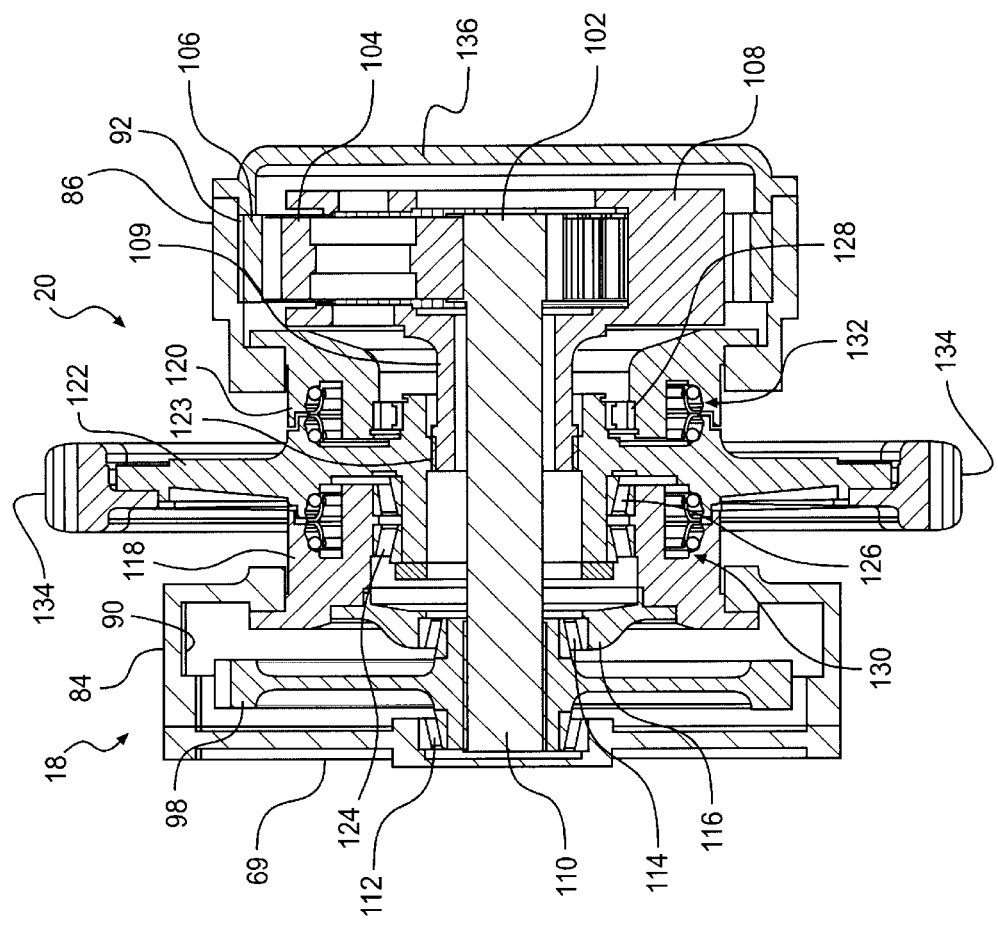
FIG. 7 is a cross-sectional view of the yoke section and planetary system taken along line IIV—IIV of FIG. 1, with the endless track removed for clarity.

FIG. 7 shows a cross-sectional view of the drive system 20 supported by the yoke section 18. The planetary system 100 may include a sun gear 102, a plurality of planetary gears 104 (only one of which is shown in the cross-section view), a ring gear 106, and a carrier 108. The drive gear 98 may be splined to a shaft portion 110 of the sun gear 102. It is to be understood that the sun gear 102 and shaft portion 110 may be formed as a single piece, as shown, or as separate pieces that are fitted together.

The drive gear 98 and shaft portion 110 may be supported within the yoke section 18 by a plurality of tapered roller bearing assemblies 112, 114. The tapered roller bearing assembly 112 may be supported within the cover 69. The other tapered roller bearing assembly 114 may be supported in a bearing carrier 116, which may be supported by one of a pair of support hubs 118, 120.

The support hubs 118, 120 may be connected to the extending support members 84, 86, respectively, using any suitable means, such as, for example, bolting (not shown). The support hubs 118, 120 may also be configured to support a sprocket hub 122 and to allow rotation thereof. This may be accomplished by providing a pair of tapered roller bearings assemblies 124, 126 between the sprocket hub 122 and the support hub 118 and by providing a roller bearing assembly 128 between the sprocket hub 122 and the support hub 120. In addition, a plurality of sealing devices 130, 132, such as, for example, dual cone seals, may also be provided between the sprocket hub 122 and the support hub 118 to seal the sprocket hub 122 and the support hubs 118, 120.

The sprocket 36 is formed by attaching a plurality of sprocket segments 134 to the sprocket hub 122. The sprocket segments 134 may be bolted to or attached by any other suitable means to the sprocket hub 122. Alternatively, sprocket segments 94 and sprocket hub 86 may be formed as an integral unit. The sprocket hub 122 may be operatively connected to and capable of rotating with the carrier 108.

The carrier 108 may be attached to the plurality of planetary gears 104, which intermesh with both the sun gear 102 and the ring gear 106. The carrier 108 may include a hollow hub portion 109 to which is connected the sprocket hub 122 using any suitable means, for example, by a spline 123. In addition, the shaft portion 110 may extend through the hollow hub portion 109.

In the exemplary embodiment shown, the ring gear 106 is nonrotatably connected in the through hole 92 of the extending support member 86. Because the ring gear 106 is held stationary, the carrier 108 is driven by rotation of the planetary gears 104 about the sun gear 102, which in turn, drives the sprocket 36.

A cover 136 is also attached to the extending support member 86 opposite the cover 69 to protect the planetary system 100 in the yoke section 18. The covers 69, 136 may be made of the same material as the roller frame 16 or any other suitable material.

For the exemplary embodiment described above, a rotation of 1000 rpm of the output shaft 56 may be converted into a rotation of approximately 67 rpm at the sprocket 36. As the output shaft 56 rotates at 1000 rpm, the pinion 60 will also rotate at 1000 rpm. As the pinion 60 rotates at 1000 rpm, the drive gear 98 will rotate at approximately 333 rpm because of the 3:1 reduction between the pinion 60 and the drive gear 98. The sun gear 102 will rotate at the same speed as the drive gear 98, which will cause the sprocket 36 to rotate at approximately 67 rpm because of the 5:1 reduction of the planetary system 100. Therefore, the entire reduction from the output shaft 56 to the sprocket 36 is approximately 15:1. It is possible to control the rotation of the sprocket 36 to any desired speed by providing the appropriate output shaft rotation and modifying the speed reduction within the drive system.

Figure 8:
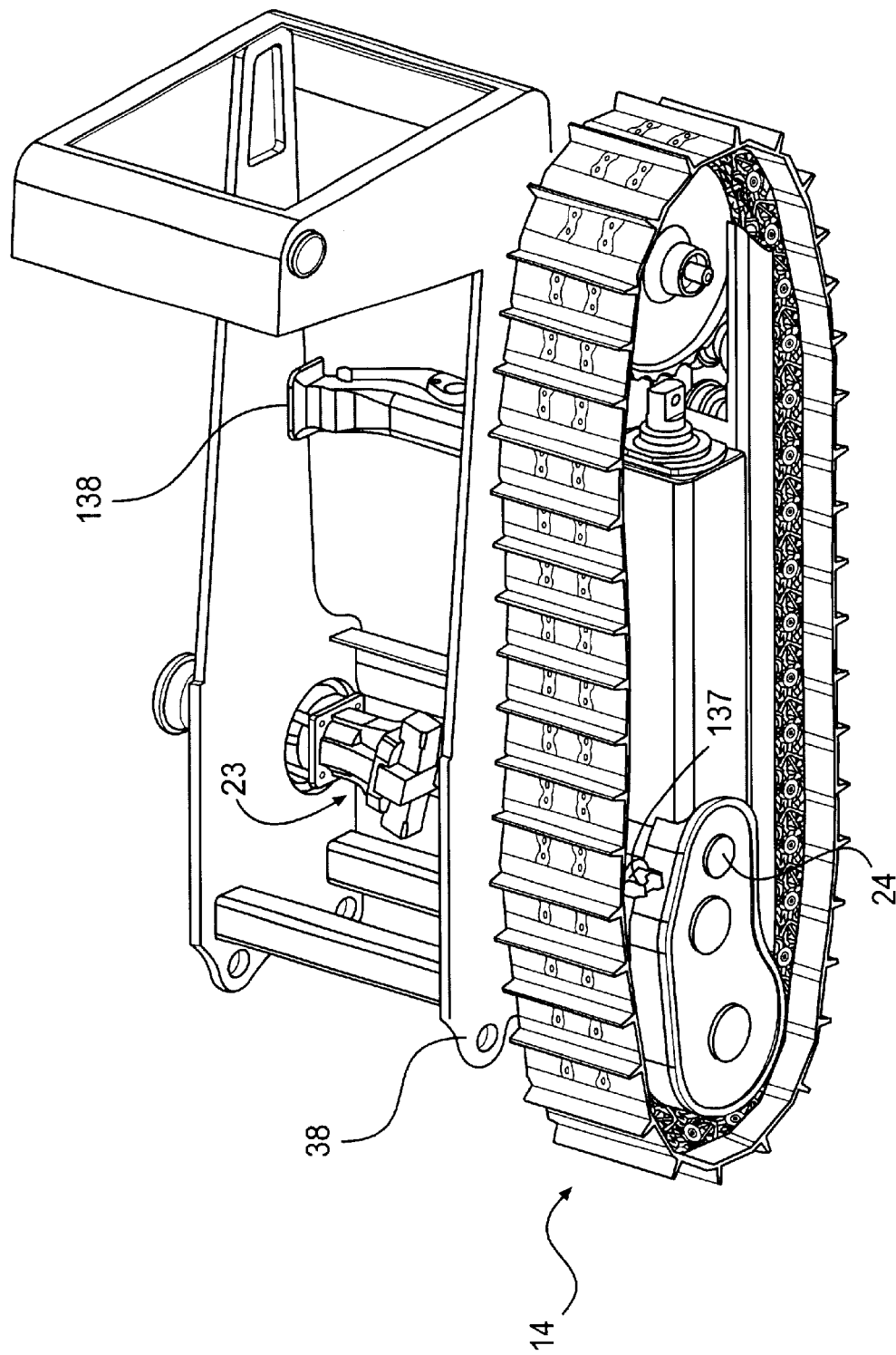
FIG. 8 is a diagrammatic perspective view of a drive assembly and machine frame of the exemplary track-type machine of FIG. 1.

As seen in FIG. 8, drive assembly 14 may be supported on the machine frame 38 by hollow pivot shaft 24. A second drive assembly (not shown for clarity), similar to the drive assembly 14 described above, can be provided on the opposite side of the body 12 to provide locomotion of the track-type machine 10.

An equalizer bar 138 may also be provided to connect the two opposing drive assemblies 14 together. The equalizer bar 138 extends between the two opposing drive assemblies and may be supported by a pin connected to a center point beneath the machine frame 38 (not shown). Each end of the equalizer bar may be attached to the opposing drive assemblies 14 using known techniques, such as, for example, providing spherical joints. When one drive assembly 14 pivots in one direction, the equalizer bar 138 can force the other drive assembly 14 to pivot in the opposite direction to maintain sufficient contact with the ground or other surface.

By supporting the drive assembly 14 on the hollow pivot shaft 24 and transmitting power therethrough, the drive assembly 14 is free to pivot relative to the machine frame 38. In this arrangement, an obstacle encountered by the drive assembly 14 can be driven over by the drive assembly 14. The equalizer bar 138 can assist the track-type machine 10 in clearing the obstacle. As one drive assembly 14 drives over the obstacle, the other drive assembly is forced downwards. This, in turn, lifts the machine frame 38 through the equalizer bar 138 so that the track-type machine 10 can clear the obstacle. In addition, because the drive system 20 is supported on the roller frame 16 free of the machine frame 38, the roller frame 16 is connected to the machine frame 38 only via the hollow pivot shaft 24 and the equalizer bar 138. With this arrangement, the drive assembly 14 is not rotationally fixed, but rather, is free to pivot relative to the machine frame 38. This arrangement allows for greater flexibility in pivoting of the drive assembly when encountering obstacles.

Additionally, at least one support roller 137 may be included to support the endless track 26. The support roller 137 may be affixed to or formed on the roller frame 16 at any suitable location. For example, the support roller 36 may be fastened or welded to the roller frame 16 before the yoke section 18, although it is understood that any location will work.

INDUSTRIAL APPLICABILITY

The machine frame and drive assembly of the present invention may be used on various track-type machines. For example, the machine frame and drive assembly may be used with tractors, track loaders, excavators, and other construction machines where an endless track is desirable. The machine frame and drive assembly may also be used to provide locomotion to, for example, heavy farm machines and forestry vehicles. Certain aspects of the invention may be practiced with a high drive track-type machine, such as, for example, the aspect of transmitting power through a hollow pivot shaft. In addition, the machine frame assembly may be used with a drive assembly wherein the sprocket is cantilevered off the end of the roller frame if desired.

The endless track 26 of the track-type machine 10 may be driven by providing power from the power source 22 to the drive system 20. The transmission of such power may be accomplished by transmitting the power from the power source 22 through the hollow pivot shaft 24 to the drive system 20 via the gear train 62. For example, when the power source is a motor 52 with an output shaft 56, the transmission of power includes converting the rotation of the output shaft 56 to translational motion of the endless track 26 about the roller frame. In this arrangement, the rotation of the output shaft 56 would drive the rotation of the pinion 60. The rotation of the pinion 60 would cause rotation of the drive gear 98 via the rotation of the idler gear 96. The rotation of the drive gear 98 would drive the sprocket 36 through its connection to the planetary system 100. The rotation of the sprocket 36 causes translational motion of the track.

Because the drive assembly is configured to allow for pivotal movement relative to the machine frame and the opposing drive assembly, the track-type vehicle has greater flexibility in moving over uneven terrain. Moreover, because the sprocket 36 is supported by the yoke section 18, less twisting of endless track 26 is generated from the contact with the sprocket 36, thereby increasing the longevity of the track.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A machine frame assembly for a track-type machine, comprising:
   a machine frame;
   a hollow pivot shaft attached to the machine frame and configured to support a drive assembly for a track-type machine to allow pivotal movement of the drive assembly relative to the machine frame; and
   a power source, a portion thereof extending into the hollow pivot shaft and a portion thereof mounted adjacent to an end of the hollow pivot shaft, wherein the power source is configured to transmit power through the hollow pivot shaft; and
   an equalizer bar extending from the machine frame to the drive assembly, such that a part of the drive assembly is supported by the hollow pivot shaft and another part of the drive assembly is supported by the equalizer bar, the equalizer bar being configured to allow the drive assembly to pivot about the hollow pivot shaft.

2. The machine frame assembly according to claim 1, wherein the power source includes a motor having an output shaft that extends within the hollow pivot shaft.

3. The machine frame assembly according to claim 2, wherein a longitudinal axis of the hollow pivot shaft is substantially parallel to a longitudinal axis of the motor output shaft.

4. The machine frame assembly according to claim 3, wherein the longitudinal axis of the hollow pivot shaft is substantially co-axial with the longitudinal axis of the motor output shaft.

5. A machine frame assembly for a track-type machine, comprising:
   a machine frame;
   a hollow pivot shaft attached to the machine frame and configured to support a drive assembly for a track-type machine to allow pivotal movement of the drive assembly relative to the machine frame;
   a power source, a portion thereof extending into the hollow pivot shaft and a portion thereof mounted adjacent to an end of the hollow pivot shaft, wherein the power source is configured to transmit power through the hollow pivot shaft; and
   a mounting ring formed in the machine frame, the hollow pivot shaft being attached to the mounting ring,
   wherein the power source includes a motor having an output shaft that extends within the hollow pivot shaft, and the machine frame assembly further includes a motor support configured to assist in supporting the motor, the motor support being arranged between the hollow pivot shaft and the mounting ring, wherein one end of the hollow pivot shaft is connected to the machine frame through the motor support.

6. The machine frame assembly according to claim 1, wherein the drive assembly includes a roller frame having a yoke section with two extending support members configured to support each side of a drive system, the two extending support members extending in the same direction and being adjacent to each other.

7. A track-type machine, comprising:
   a machine frame;
   a hollow pivot shaft attached to the machine frame;
   a power source configured to transmit power through the hollow pivot shaft;
   a drive assembly supported on the hollow pivot shaft, wherein the drive assembly includes a drive system and an endless track that engages the drive system; and
   an equalizer bar extending from the machine frame to the drive assembly, such that a part of the drive assembly is supported by the hollow pivot shaft and another part of the drive assembly is supported by the equalizer bar, the equalizer bar being configured to allow the drive assembly to pivot about the hollow pivot shaft.

8. The track-type machine according to claim 7, wherein the power source is chosen from one of a hydrostatic motor and an electrical motor.

9. The track-type machine according to claim 7, wherein the drive assembly further includes a roller frame including a through hole, and the drive assembly is supported on a free end of the hollow pivot shaft via the through hole to allow pivotal movement of the drive assembly relative to the machine frame.

10. The track-type machine according to claim 7, wherein the power source includes a motor having an output shaft that extends into the hollow pivot shaft and is free to rotate therein.

11. The track-type machine according to claim 10, wherein a longitudinal axis of the hollow pivot shaft is substantially parallel to a longitudinal axis of the motor output shaft.

12. The track-type machine according to claim 10, wherein the drive assembly further includes a gear train that intermeshes the drive system to the motor output shaft.

13. The track-type machine according to claim 12, wherein the gear train includes a pinion supported on an end of the output shaft, and the pinion constrains the motor output shaft within the hollow pivot shaft.

14. A track-type machine, comprising:
a machine frame including a pivot shaft;
a drive assembly supported on the pivot shaft to provide pivotal movement relative to the machine frame, the drive assembly including a roller frame having a yoke section including two extending support members, a drive system including a planetary system and a sprocket operatively connected to the planetary system, the drive system being supported between the two extending support members, and an endless track entrained about the roller frame and driven by the sprocket of the drive system; and
an equalizer bar extending from the machine frame to the drive assembly, such that a part of the drive assembly is supported by the hollow pivot shaft and another part of the drive assembly is supported by the equalizer bar, the equalizer bar being configured to allow the drive assembly to pivot about the hollow pivot shaft.

15. The track-type machine according to claim 14, further including a power source, wherein the pivot shaft is a hollow pivot shaft, and the power source is configured to transmit power through the hollow pivot shaft to the drive system.

16. The track-type machine according to claim 15, wherein the power source includes a motor having an output shaft that extends into the hollow pivot shaft and is free to rotate therein.

17. The track-type machine according to claim 16, wherein the drive assembly includes a gear train arranged between the output shaft and the drive system.

18. The track-type machine according to claim 14, wherein the drive assembly includes a roller frame having a yoke section with two extending support members configured to support each side of a drive system, the two extending support members extending in the same direction and being adjacent to each other.

19. A method of driving a track-type machine, wherein the track-type machine includes a machine frame, a hollow pivot shaft attached to the machine frame, a power source configured to transmit power through the hollow pivot shaft, and at least one drive assembly supported on the hollow pivot shaft, the drive assembly including a drive system and an endless track that engages the drive system, the method comprising:
transmitting power from the power source through the hollow pivot shaft to the drive system;
supporting at least part of the weight of the track-type machine through an equalizer bar extending from the drive assembly to the machine frame; and
driving the endless track with the drive system.

20. The method according to claim 19, wherein the power source includes a motor having an output shaft that is free to rotate within the hollow pivot shaft, the method including converting the rotation of the output shaft into translational motion of the endless track.

21. The method according to claim 20, wherein the drive assembly includes a gear train arranged between the output shaft and the drive system, the method including intermeshing the output shaft to the drive system via the gear train.

* * * * *